United States Patent [19]

Greenberg

[11] Patent Number: 5,305,139
[45] Date of Patent: Apr. 19, 1994

[54] ILLUMINATION SYSTEM AND METHOD FOR A HIGH DEFINITION 3-D LIGHT MICROSCOPE

[75] Inventor: Gary Greenberg, Los Angeles, Calif.

[73] Assignee: Unimat (USA) Corporation, formerly United Holdings, Inc., Los Angeles, Calif.

[21] Appl. No.: 819,140

[22] Filed: Jan. 10, 1992

Related U.S. Application Data

[63] Continuation-in-part of Ser. No. 688,170, Apr. 19, 1991.

[51] Int. Cl.⁵ .................. G02B 21/06; G02B 21/18
[52] U.S. Cl. ...................... 359/390; 359/368; 359/373; 359/385
[58] Field of Search .............. 359/368-373, 359/900, 385-390; 354/402

[56] References Cited

U.S. PATENT DOCUMENTS

| | | | |
|---|---|---|---|
| 2,601,175 | 6/1952 | Smith | 359/371 |
| 2,685,228 | 8/1954 | Kavanagh | 359/370 |
| 3,876,283 | 4/1975 | Judd | 359/385 |
| 4,255,014 | 3/1981 | Ellis | 359/371 |
| 4,601,551 | 7/1986 | Pettingell et al. | 359/387 |
| 4,873,653 | 10/1989 | Grosskopf | 359/371 |
| 4,953,950 | 9/1990 | Arata et al. | 359/618 |
| 5,126,877 | 6/1992 | Biber | 359/385 |
| 5,144,356 | 9/1992 | Kurbitz et al. | 359/402 |

FOREIGN PATENT DOCUMENTS

| | | | |
|---|---|---|---|
| 12615 | 2/1981 | Japan | 359/385 |

*Primary Examiner*—Bruce Y. Arnold
*Assistant Examiner*—Thong Nguyen
*Attorney, Agent, or Firm*—H. Michael Brucker

[57] ABSTRACT

An illumination system and method for providing real-time 3-D viewing and increased resolution, sharpness, depth of field, and perception of depth for a transmitted light microscope including a condenser lens having an optical axis, objective lens having an optical axis, and an eye piece, wherein a light beam path shift device enables two or more separate light beams to be directed onto the condenser along paths that are not coincident with the condenser lens optical axis and that produce beam exit paths from the condenser lens which are at maximum oblique angles relative to the objective lens axis which are within the objective lens aperture.

8 Claims, 9 Drawing Sheets

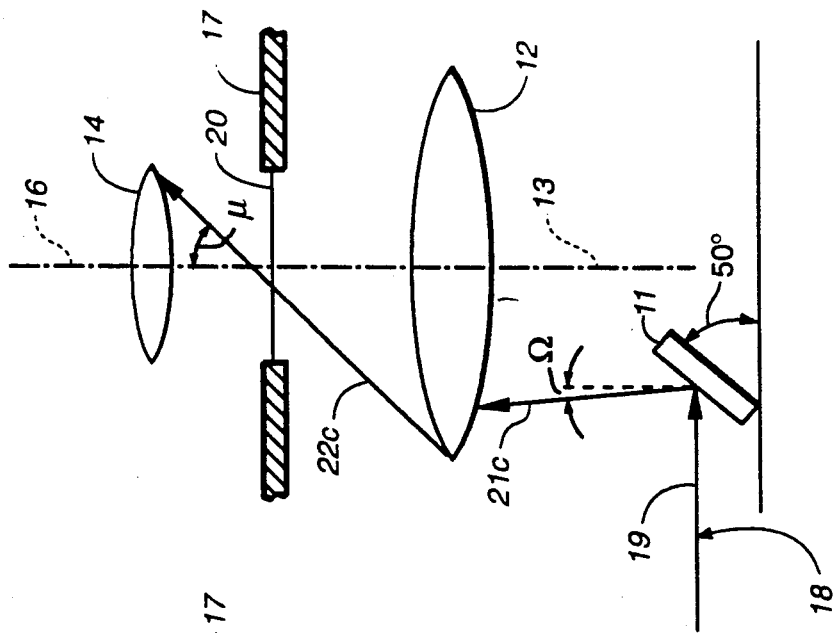
FIG._1C
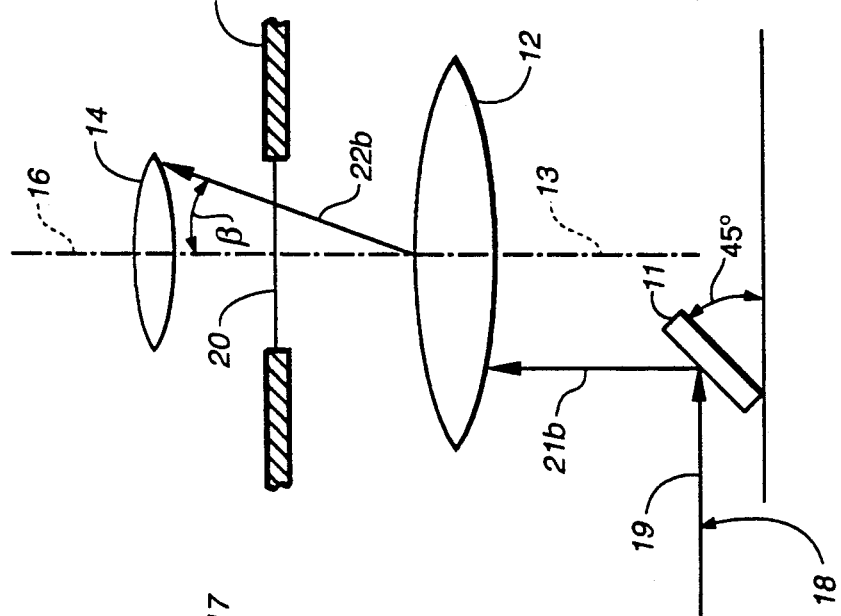
FIG._1B
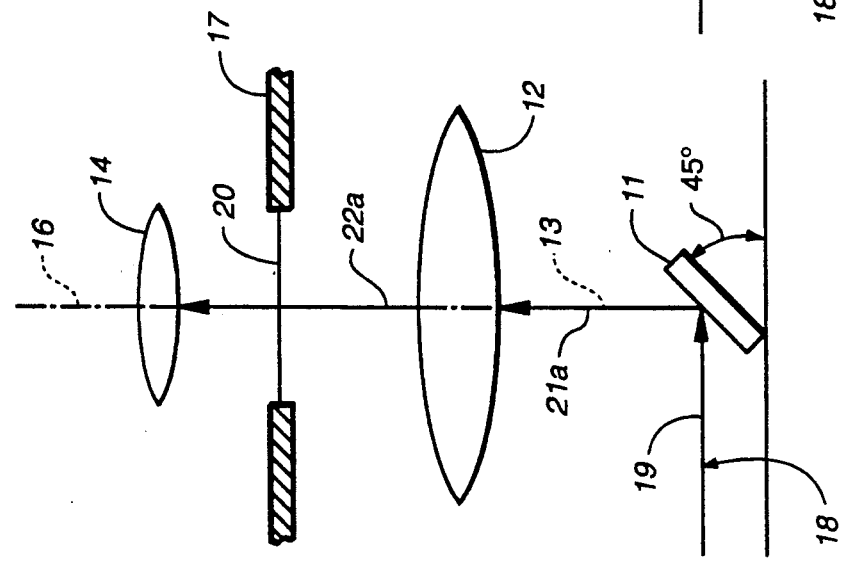
FIG._1A

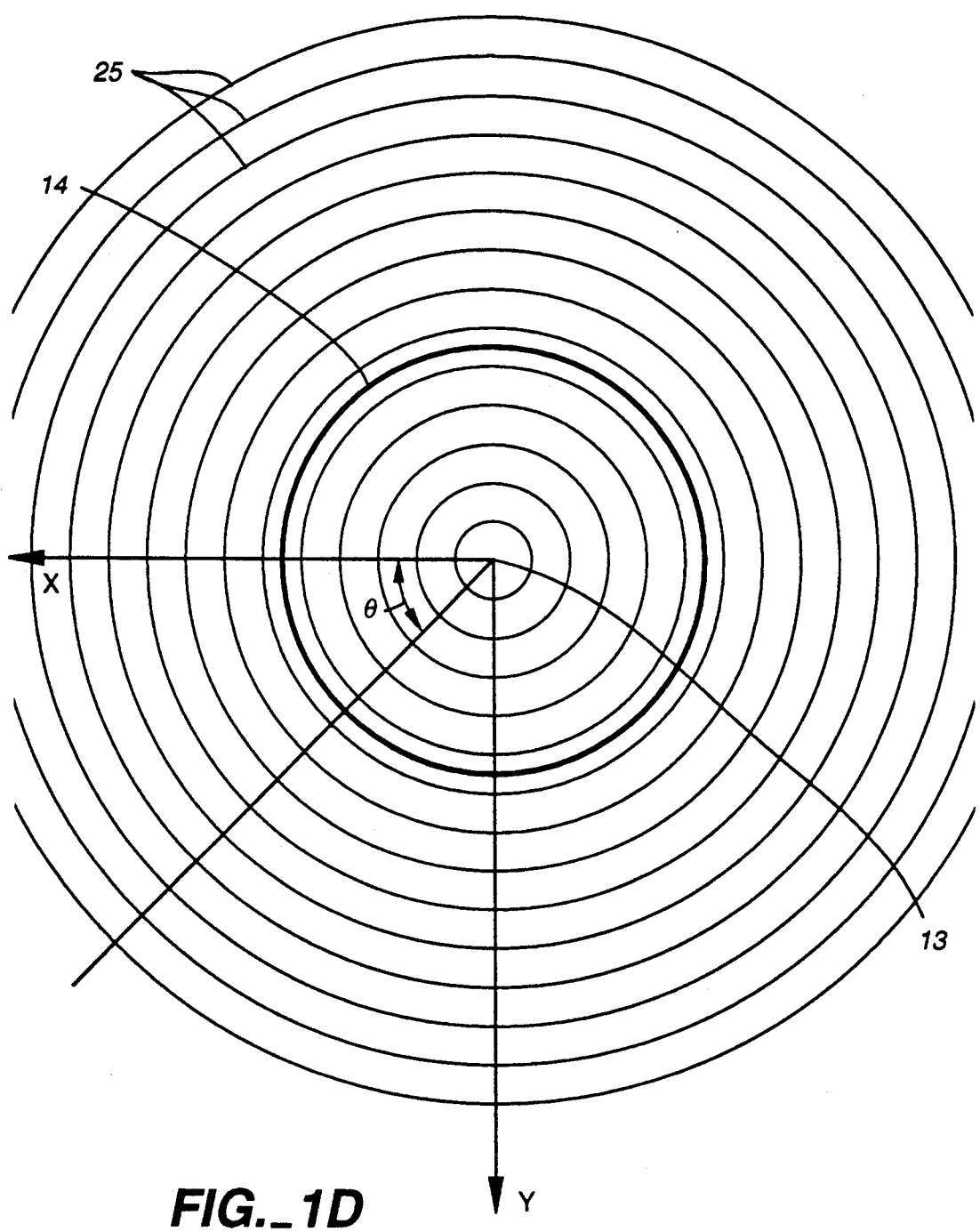
FIG._1D

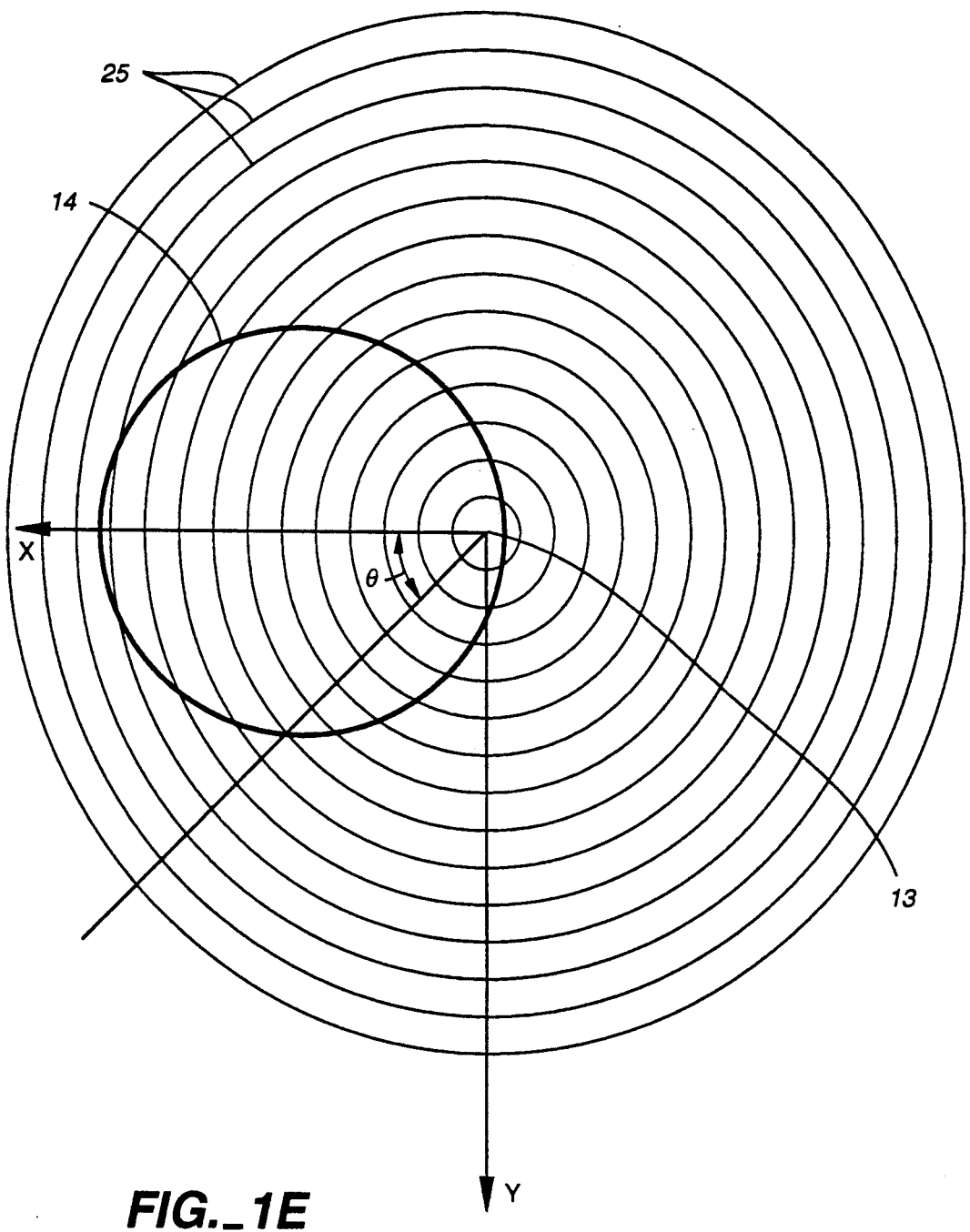
FIG._1E

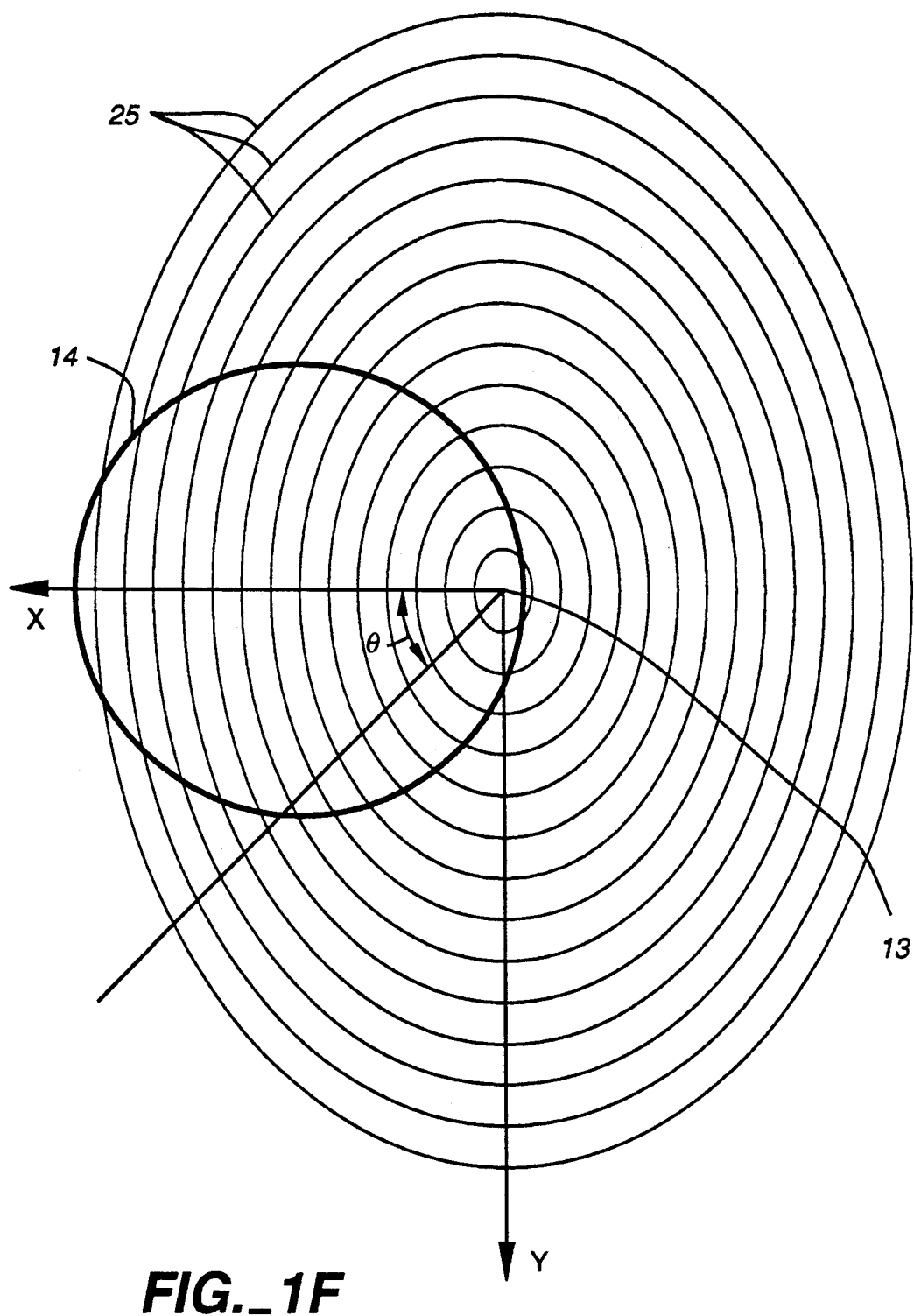
FIG._1F

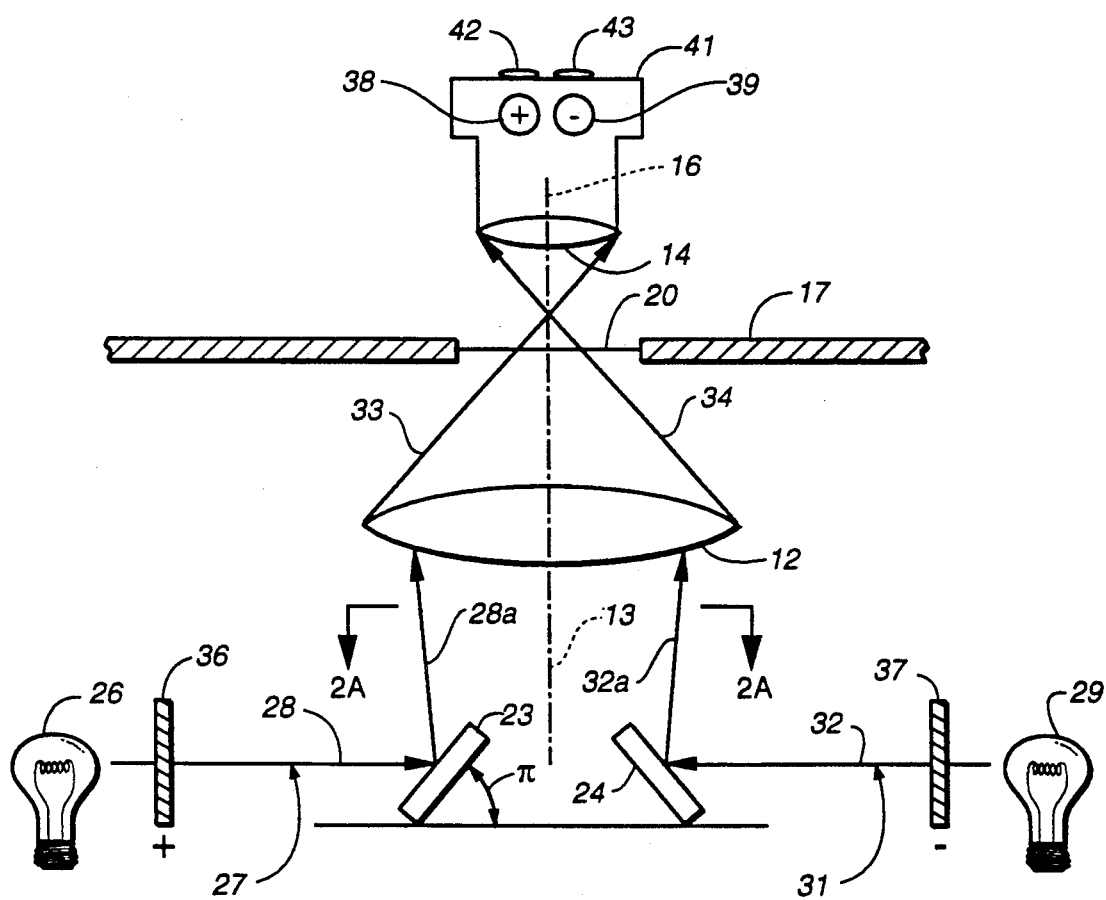
FIG._2

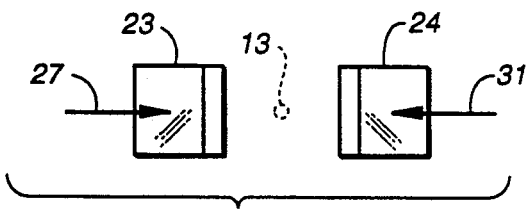
FIG._2A
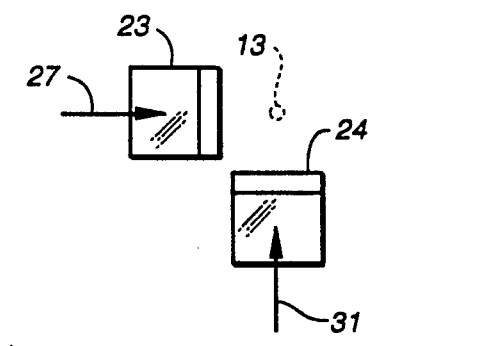
FIG._2B
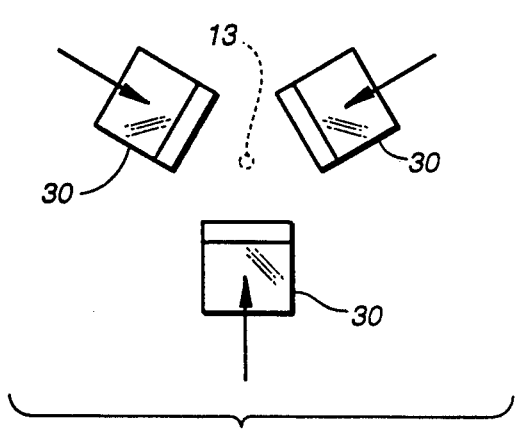
FIG._2C
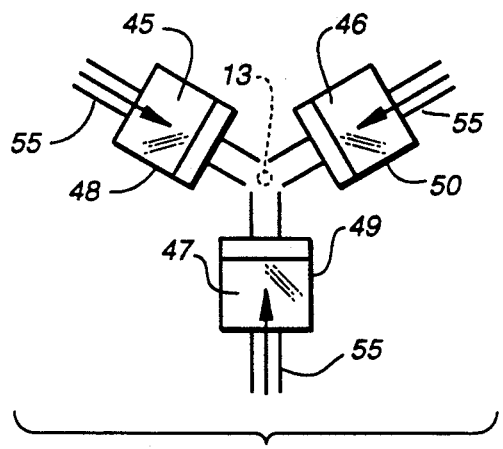
FIG._3A
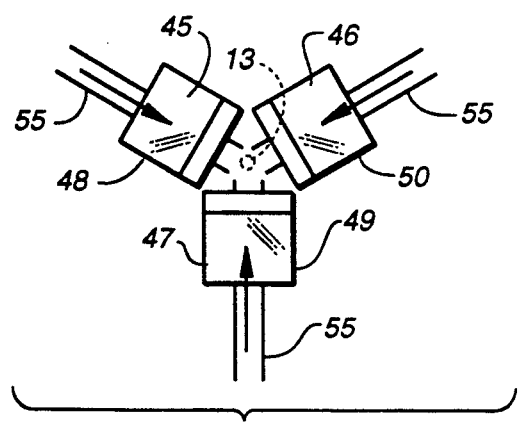
FIG._3B
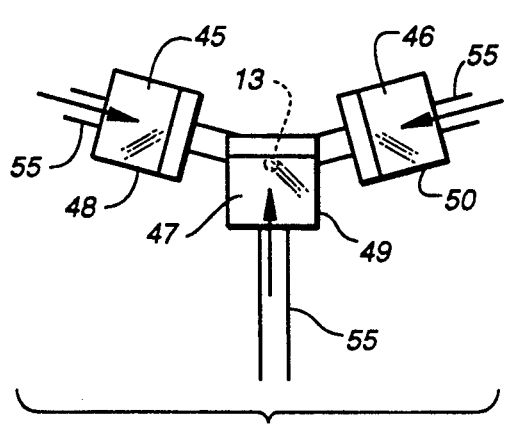
FIG._3C

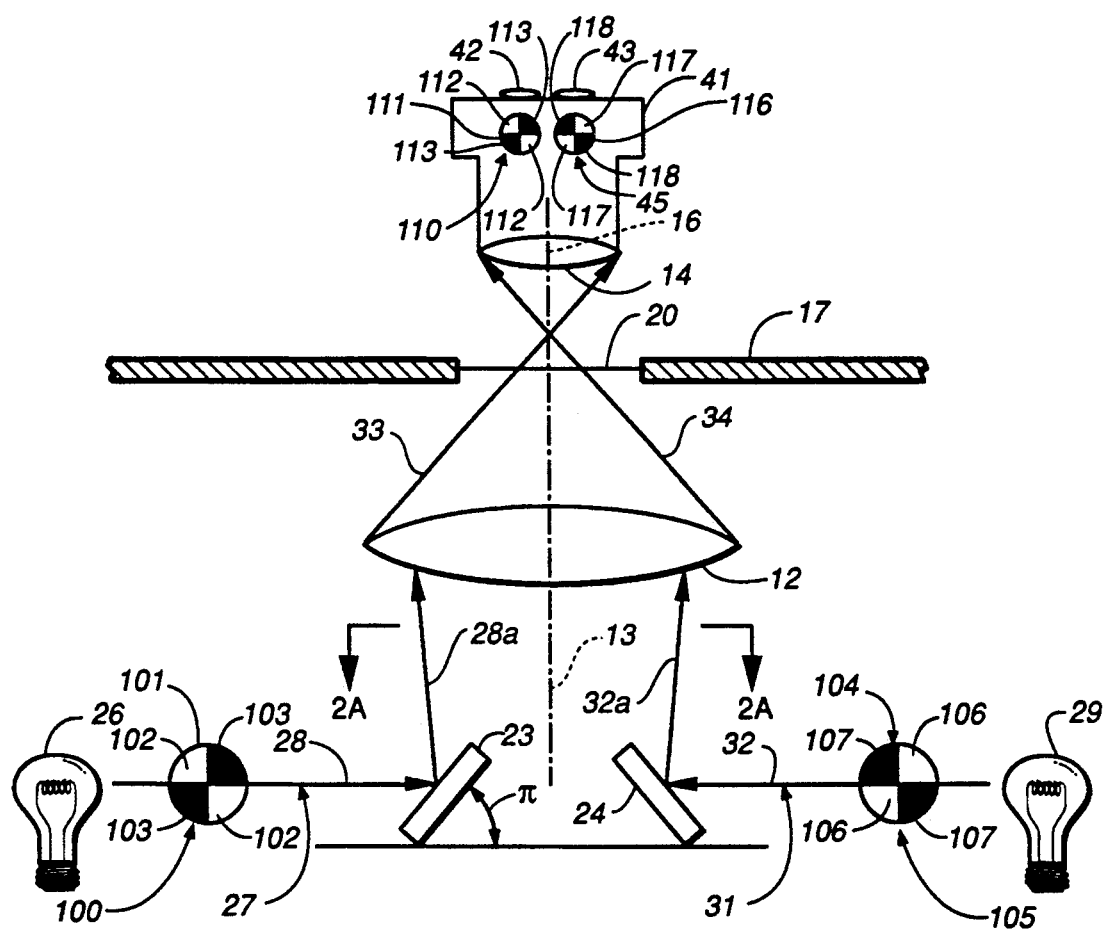
FIG._2D

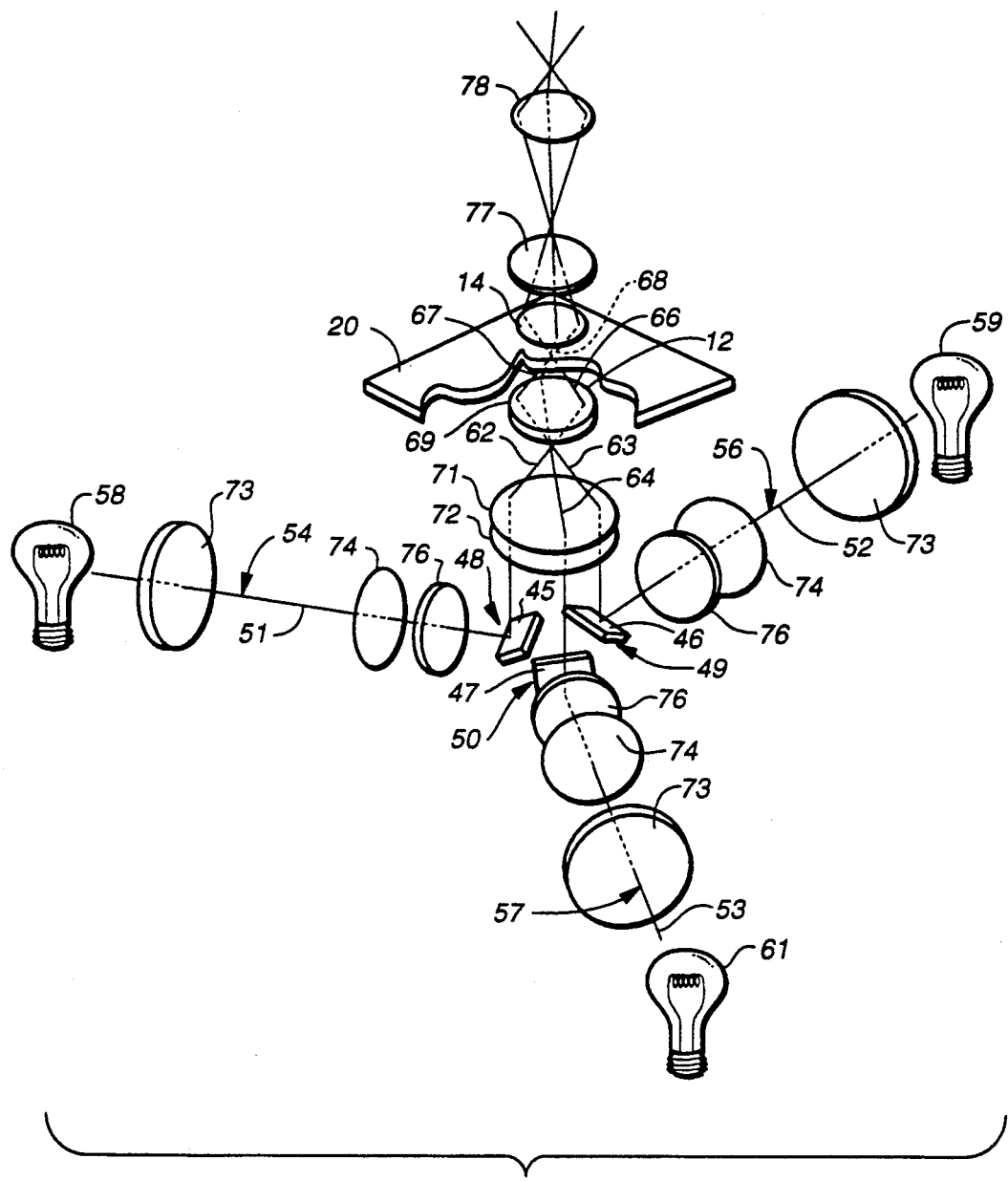
FIG._3

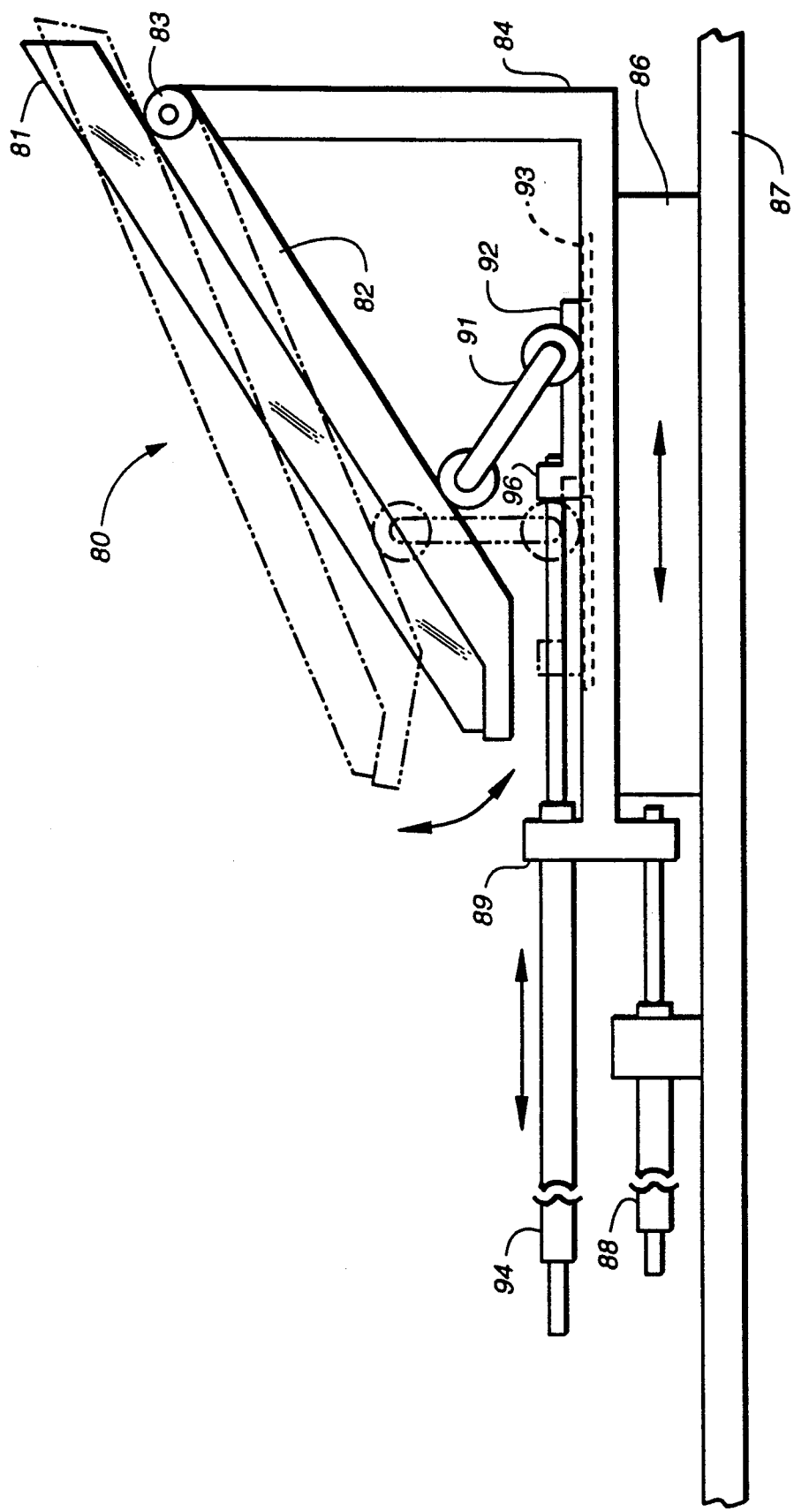
FIG._4

ILLUMINATION SYSTEM AND METHOD FOR A HIGH DEFINITION 3-D LIGHT MICROSCOPE

This application is a continuation-in-part of my pending application Ser. No. 07/688,170 filed Apr. 19, 1991.

BACKGROUND OF THE INVENTION

1. Field of the Invention

This invention relates to illumination systems for transmitted light microscopes utilizing condenser lens means and more particularly to such systems that utilize one or more illuminating light beams whose axes are directed at an oblique angle relative to the optical axis of the microscope objective.

2. The Prior Art

The use with microscopes of what is commonly refereed to as "oblique light" was of interest towards the end of the last century and the beginning of this, but the many devices designed for that purpose, although ingenious in some cases, have failed to survive. See *The Intelligent Use of the Microscope*, Oliver, C. W., Chemical Publishing Co., 1953.

Oliver carefully limits his meaning of "oblique light" to the "use of a narrow cone or beam of rays directed upon the object [specimen] from any direction other than the optical axis provided that it enters the object glass." Ibid. at 94. In this way he excludes from his discussion those systems that use rays directed onto a specimen from a direction other than the optical axis but which do not enter the object glass as well as systems where the light does not enter the objective lens at an angle (such as systems that merely tilt the specimen stage). Illumination provided by systems in which the primary beam does not enter the objective is generally known and commonly refereed to as "dark field" illumination as more fully discussed in *Photomicrography a Comprehensive Treatise*, Loveland, R. P., John Weily & Sons, Chapter 12. Although the present invention utilizes true oblique lighting as that term is used by Oliver, and is thereby clearly distinguishable from "dark field" systems, a brief description of "bright field" and "dark field" illumination will help to differentiate and more fully highlight the attributes of the present invention.

Illumination systems that direct rays onto a specimen along the optical axis create "bright field" illumination, so named because the rays passing through the field surrounding the specimen and entering the microscope objective are unimpeded and thus bright compared to the rays attenuated by passing through the specimen. In a "dark field" system, the relative brightness is reversed by directing only light rays onto the specimen field which are angled relative to the optical axis and directed to fall outside the objective aperture. All of the light passing through the specimen field surrounding the specimen is unimpeded and thus does not enter and is therefore not "seen" by the objective. Some of the light directed onto the specimen will be scattered, however, into secondary light rays, some of which will enter the objective (and be "seen"). Thus, the object appears brighter than the surrounding dark field. Such a system is described in U.S. Pat. No. 4,896,966.

The prior art contains a number of systems that combine "bright field" and "dark field" illumination for use both together and selectively, as illustrated in U.K. Pat. No. 887,230, and U.S. Pat. No. 4,601,551. In all of these systems the primary illuminating light is either aligned with the optical axis or angled to fall outside of the objective aperture.

The invention of U.S. Pat. No. 3,876,283, teaches the use of a system which uses true oblique lighting, by use of a prism located on the optical axis of a microscope condenser to laterally off-set an axial illumination beam to a path separate from the optical axis so as to direct the beam onto an off center location on the condenser lens. When a light beam parallel to the optical axis enters an off center location on a condenser lens, the beam will exit the lens at an angle to the optical axis. The degree of the angle is a function of the displacement of the beam from the center of the lens. When, as in patent '283, the angle is within the objective aperture, the system produces true oblique lighting as defined by Oliver (the light is "seen" by the objective). In order to achieve the maximum oblique angle for the beam it must exit the condenser lens at or very near its periphery at an angle that is just within the objective aperture. While the teachings of patent '283 make this possible (by adding a wedge shaped prism to the plano prism shown), each different condenser and objective combination will require a different pair of prisms to achieve a maximum angle. Otherwise, depending on the characteristics of the objective lens and condenser lens being used, it may be necessary with the system of patent '283 to direct the laterally off-set beam onto the condenser lens at a location inwardly of its periphery in order to have the resultant exit angle within the objective aperture. In such cases the maximum possible oblique angle will not be realized and, as will be explained below, the maximum resolution power of the system will not be achieved.

In patent '283, the location of the illuminating beam (between 15 and 17) and beam path shifting means 23 (prism) on the optical axis limits the system by permitting the use of only a single illumination beam.

The references cited above are typical of the prior art in that they fail to recognize the real potential of oblique lighting to enhance resolution. Patent '283, in fact, does not acknowledge the resolution enhancing potential of oblique light but instead cites as a reason for its use the casting of shadows to highlight uneven areas of the specimen. It is not, therefore, necessarily an object or desiderata of patent '283 to provide a maximum oblique angle (for example, too much shadowing might obscure details). But, one of the requirements of realizing the full potential of oblique lighting to dramatically enhance resolution is that the angle of the oblique light be maximized. For a single beam system, maximum resolution is achieved for a given condenser lens/objective lens combination by having the illumination beam exit the condenser lens' periphery so that the light illuminating the object is at a maximum oblique angle and still within the objective aperture. By making it possible to adjust the angle at which the beam exits the condenser lens independently of the location where it exits, the angle of the light (relative to the optical axis of the objective lens means) can be fully maximized. Likewise, by being able to adjust the location where the beam exits the condenser independently of the angle at which it exits, any condenser can be used to its fullest potential. With the ability to so adjust the angle and location of the beam exiting the condenser lens, a large condenser lens (high numerical aperture) can be used to achieve maximum oblique lighting for most objective lenses.

The present invention teaches that the essential requirement for realizing the maximum potential of true oblique lighting is the ability to direct two or more separate and distinct light beams onto the condenser wherein each beam is at the maximum angle to the objective axis that permits the illumination to enter the objective. This, of physical necessity, requires that the beam shifting means be located off the optical axis of the condenser. In addition, the present invention overcomes the anistropy that is found in prior art oblique illuminating systems.

In addition, the present invention teaches a real time, 3-D system using multiple beams which goes far beyond what can be achieved with a single beam, such as that described in U.S. Pat. No. 4,072,967. Patent '967 teaches how to achieve a 3-D image using a microscope with a single condenser lens and a single objective lens, by placing complimentary filters across the left and right halves of the condenser lens and placing a complementary filter set in the binocular eyepieces. With this type of system the degree of parallax is fixed. Furthermore, there is very little disparity in parallax between the left and right images, especially at the center of the image field. In contrast, with the present invention the left and right images are independently controlled and the degree of parallax between them can be easily adjusted to match the type of objective being employed and the type of specimen being viewed. In addition, there is another and possibly even more important advantage with the present invention, which is the ability to achieve a greater depth of field without loss of resolution, as is more fully explained below. This is a critical prerequisite for producing a sharp 3-D image.

SUMMARY OF THE INVENTION

The present invention resides in the illumination system for a transmitted light microscope characterized by condenser lens means (which can be comprised of several lenses) and an objective lens means (also comprised of several lenses). The object or specimen to be illuminated is located between the condenser and the objective.

The diffraction theory of microscopic vision teaches that when examining with transmitted light an object having very closely spaced structural details such as the markings of the diatom *Amphipleura pellucida*, the resolution and sharpness of the tiny lines in the image depend upon the number of orders of diffraction wavelets that are collected by the objective lens and used to form the image. The number and arrangement of the diffraction orders depends upon the lines in the object and the wavelength of light being used and other factors. The finer the detail on the object the greater the angular separation between the orders. The more successive orders of wavelets recombined with the central beam the more the resolution and sharpness of the image increases.

Using an axial illuminating beam on an object such as the diatom *Amphipleura pellucida*, creates diffraction orders over such a large angle that even the highest numerical aperture objectives available cannot include all of them. The specimen's markings remain unresolved and thus invisible.

The use of oblique lighting can result in the inclusion of one or more orders of wavelets for a specimen which are lost when illuminated by axial lighting. The greater the angle of the oblique light the greater the number of orders of wavelets included within the objective aperture and thus the greater the resolving power of the system. In fact, both the resolution as well as the sharpness of the image can be significantly increased compared to axial illumination, because the optimal oblique illumination will place the zero order wavelet near the edge of the objective aperture and thus, the objective can recombine more orders of diffraction wavelets for any given structural detail.

Accordingly, it is a principal object of the present invention to provide an illumination system and method for a transmitted light microscope which produces oblique lighting having the maximum angle possible for the lenses used thereby enhancing the microscope's resolving power and sharpness of image.

In conjunction with the object stated above is an object of the invention to utilize the entirety of the beam or beams directed onto the condenser as illumination sources for the specimen. That is to say, that the present invention, unlike so much of the prior art, does not use a mask on the condenser or between the condenser and the specimen to create an oblique light beam from a small portion of the beam initially directed onto the condenser.

It is a further object of the invention to provide for a transmitted light microscope having a condenser lens, an illumination system which produces an oblique light beam which is independently selectively adjustable in both the location and angle at which it exits the condenser lens.

While the use of a single illuminating beam according to the present invention achieves results which can surpass the prior art in terms of resolution, and is within the scope of the invention, the maximum potential of oblique lighting is achieved in the present invention when a plurality of independent beams are used. Specifically, while a single beam system produces enhanced resolution, it does so predominantly along the direction of the beam axis (projected onto the specimen plane). Furthermore, at 90 degrees to that axis there is a significant decrease in resolution and sharpness. For example, in order to see the detailed pattern of *Amphipleura pellucida* the specimen must be rotated on the stage so that the markings are oriented along the axis of the oblique illuminating beam. As the specimen is rotated away from that optimal position, the markings become less distinct and finally disappear altogether. As the specimen is rotated further, the markings become visible again as the orientation approaches 180 degrees. This is a result of the fact that while a single oblique beam increases resolution along an X dimension, it decreases resolution along the perpendicular Y dimension. If, however, two oblique beams illuminate a specimen so that their angle of orientation is 90 degrees apart, then the image resolution and sharpness is increased in both the X and Y dimensions. Enhanced resolution over essentially the entire specimen plane is achieved using multiple oblique illuminating beams radially spaced about the optical axis of the condenser. As a result, very fine structural details such as the markings on *Amphipleura pellucida* can be seen regardless of how the specimen is oriented on the stage.

When multiple beams are used, enhanced resolution is derived not only from the benefits of oblique illumination but also from the overall increase in the system's N.A. (numerical aperture) that results from multiple beams following different oblique paths from the condenser to the objective. That is, the "working" N.A. of the condenser beam is increased beyond its normal potential because a highly oblique beam of light will exit the condenser lens at a greater angle than will a normal axial beam. The increased exit angle will only be on one side of the condenser while the exit angle will be deficient on the opposite side of the condenser. If however, a second oblique light beam is directed into the condenser at the opposing angle relative to the first beam, then both sides of the condenser will project an exit beam with a greater angle than would be possible with a single central light beam. Thus, multiple oblique light beams can be directed into a condenser lens at opposing angles relative to the optical axis such that the resulting exit beams will combine to form an overall increase in the aperture of illumination and thus, an increase in the overall resolution of the system. The final resolution of the image is dependent on the N.A. of the system. For microscopes using an objective lens along with a condenser lens, the N.A. of the system will be the combination of the N.A. of objective and condenser lenses.

Thus, another object of the invention is to provide an illumination system and method for a transmitted light microscope utilizing a plurality of independent, separate illuminating light beams directed onto a condenser wherein each light beam follows a different oblique angled exit path to the objective (relative to the objective's optical axis).

Another object of the invention is to provide an illumination system for a transmitted light microscope utilizing a plurality of independent separate illuminating light beams directed onto a condenser wherein the exit path of each light beam from the condenser is independently adjustable in both its location and angle. Such a system enjoys, in addition to the advantages already stated, the advantage of being able to significantly increase the depth of field without degradation of resolution.

It is well known that in a conventional illumination system for a microscope, reducing the condenser aperture to increase depth of field and contrast, reduces resolution. A known alternative method for increasing depth of field is to slightly under focus the condenser lens (keeping the condenser aperture fully open) while closing a field stop iris to increase depth of field. If a single illuminating beam is used, whether it be axial or oblique, then the increase in depth of field will be accompanied by a decrease in resolution. In the present invention, multiple oblique beams are directed onto the condenser so that even when the field lens aperture is reduced to increase depth of field and contrast, resolution is not degraded. This follows because overall aperture of illumination at the condenser lens, which continues to receive and transmit light beams from its full aperture, has not been reduced. Put in another way, the final image is the combination of multiple images, each with extended depth of field created by an array of pre-apertured oblique illuminating beams, which have an additive effect on the overall aperture of illumination.

Yet another object of the invention is to provide means for using double oblique lighting in a transmitted light microscope having a condenser lens which produces enhanced resolution and real time 3-D viewing with extended depth of field.

By directing separate independent illuminating light beams onto the condenser, it is possible in the present invention to manipulate each beam independently if desired, such as by interposing complementary filters and thereby produce true, real time 3-D viewing. The interposition of polarizing filters in the path of one or more beams permits a variety of effects, such as selective shadow rotation, to be achieved at the same time that enhanced resolution is realized.

Other objects of the present invention will in part be obvious and will in part appear hereafter.

A significant part of the present invention teaches how to realize the maximum potential of oblique illumination by directing two or more separate and distinct oblique light beams into the condenser lens in a variety of configurations in order to achieve results which would not be possible with a single illuminating beam. Some of those configurations will be illustrated and their advantages discussed. However, there are other possible configurations that will not be specifically discussed but still fall within the scope of these teachings.

BRIEF DESCRIPTION OF THE DRAWINGS

The foregoing and other objects, aspects and advantages of the invention will be better understood from the following detailed description of the preferred embodiment of the invention with reference to the drawings in which:

FIG. 1A is a schematic diagram of microscope optical elements (including a condenser lens and an objective lens) wherein the illumination path is coincident with the axes of the lenses;

FIG. 1B is a schematic diagram of the microscope optical elements of FIG. 1A wherein the illumination path is parallel to but not coincident with a condenser lens and oblique to the objective lens;

FIG. 1C is a schematic diagram of the microscope optical elements of FIG. 1A wherein the illumination path is non-coincident with and oblique to the axes of both lenses;

FIG. 1D is a wave diagram illustrating the relative number of orders of wavelets that can be seen by the objective lens by the illumination arrangement of FIG. 1A;

FIG. 1E is a wave diagram illustrating the relative number of orders of wavelets that can be seen by the objective lens by the illumination arrangement of FIG. 1B;

FIG. 1F is a wave diagram illustrating the relative number of orders of wavelets that can be seen by the objective lens by the illumination arrangement of FIG. 1C;

FIG. 2 is an optical schematic illustration of a two beam embodiment of the invention;

FIGS. 2A and 2B are plan views illustrating two possible mirror arrangements for the embodiment of FIG. 2;

FIG. 2C is a plan view illustrating a three mirror configuration;

FIG. 2D is a schematic essentially identical to FIG. 2 with filters replaced by shutters;

FIG. 3 is an isometric, optical schematic illustration of a three beam embodiment of the invention;

FIGS. 3A, 3B and 3C are plan views of the mirrors of FIG. 3 in varying arrangements; and FIG. 4 is an isometric illustration of a beam shift means of the invention.

DESCRIPTION OF PREFERRED EMBODIMENTS

An important aspect of the present invention is best described with reference to FIGS. 1A-1C wherein a light beam path shift means (mirror) 11, a condenser lens means 12 having an optical axis 13, an objective lens means 14 having an optical axis 16, and a specimen support stage 17 disposed between the condenser 12 and the objective 14 and defining a specimen plane 20, are the basic components of a microscope illumination system. The support stage 17 holds a specimen (not shown) to be illuminated by light beam 18 from a light beam source means (not shown). The axis 13 of the condenser 12 and the axis 16 of the objective 14 are shown as being coincident which is the most common arrangement for transmitted light microscopes. Such axial coincidence is not required by the present invention, however, which is equally operative in a system where, for example, the condenser is tilted relative to the objective. Although both the condenser means 12 and the objective means 14 are each shown diagrammatically as a single lens, it will be understood by those skilled in the art that the condenser means and the objective means may be comprised of multiple elements as well as other optical devices known in the art.

When as shown in FIG. 1A, the mirror 11 is positioned on the condenser axis 13 and disposed at a 45 degree angle relative to the initial path 19 of beam 18, which is normal to the condenser axis 13, the path 21a of the beam after being shifted by the mirror 11 will fall along the axis 13.

Unless otherwise stated, lines indicated as representing a beam path such as 19 and 21a, are schematic representations of a beam's axis. In reality, of course, a beam has an envelope which can be converging, diverging or parallel. An understanding of the present invention is best facilitated, however, by following the path of a beam's axis.

As is well known, a beam incident a condenser such as 12 along its axis 13 will emerge from the lens along an axial path 22a. For the arrangement of FIG. 1A the beam path 22a will pass through the specimen plane 20 at right angles thereto and include the objective lens 14 along its axis 16. FIG. 1A represents a typical "bright field" illumination system.

When mirror 11 is laterally displaced from the axis 13 of condenser 12 while being maintained at a 45 degree angle, as shown in FIG. 1B, the shifted beam path 21b remains parallel to condenser axis 13 but is laterally displaced therefrom. The effect of the beam path 21b entering condenser 12 at an off axis location is to create an angle $\beta$ between the exit beam path 22b and the objective axis 16. However, the exit location of the beam 22b from the condenser means 12 is not laterally displaced from the condenser optical axis 13.

Since the specimen plane 20 is at right angles to the objective axis 16 the beam path 22b will be angled or oblique to a specimen in the specimen plane 20. For the purposes of the present invention, however, the important relationship is the angle $\beta$ between the exit beam path 22b from the condenser 12 and the optical axis 16 of the objective 14. The advantages of the present invention do not, for example, accrue from a system that creates an oblique angle between the specimen plane and the illuminating beam path by tilting the specimen stage while at the same time allowing the illuminating beam to travel a path that is parallel to the objective axis. Such an arrangement still produces standard "bright field" illumination enhanced only by some possible shadowing.

Referring to FIG. 1C, mirror 11 is inclined relative to the path 19 of incident source beam 18, to be greater than 45 degrees (50 degrees for example), causing an angle of reflectance for the beam that sets the beam path 21c to the condenser means 12 at an angle $\Omega$ relative to the optical axis 13 of the condenser means. The effect of beam path 21c entering condenser 12 at an angle $\Omega$ is to laterally shift the location of the exit beam path 22c from the center of the condenser lens means 12 to some location nearer the periphery. Thus, by changing the angle of the mirror 11 relative to the beam path 19, as well as laterally displacing it off of axis 13, as shown in FIG. 1C, the beam path shift means 11 is operative not only to control the angle of the exit path 22c but its location on the condenser 12 as well. Under these circumstances, the angle of oblique illumination is increased (angle $\mu$ in FIG. 1C is greater than angle $\beta$ in FIG. 1B). Thus, the angle of the exit beam path 22c from the condenser 12 is a function of the lateral (radial from axis 13) displacement of the incident beam path 21c, while the lateral (radial from axis 13) position of the exit beam path 22c on the condenser 12 is a function of the angle of the incident beam path 21c relative to the axis 13 of the condenser means 12.

One desiderata of the present invention is the manipulation of the beam path shift means 11 to maximize the angle of the exit beam from the condenser within the limits of the aperture of the objective. This will depend on the specification of the lenses, such as the focal length, working distance and numerical aperture.

For a given size condenser 12, the maximum oblique angle of the beam passing through the condenser relative to the objective axis 16 within the objective aperture, is achieved by having the beam path exit the condenser at or very near the edge of the condenser lens 12. This is achieved by varying the angle of mirror 11 relative to the source beam path 19 and thereby the angle $\Omega$ of the beam path 21c to the condenser. At the same time, in order to create true oblique lighting, all or a portion of the beam must enter the objective, requiring that for a particular objective, the exit beam path from the condenser be at a particular angle as well as location. And, as explained above, the angle $\mu$ is varied as a function of the radial location of the mirror 11 and thereby the radial location of the entering beam path 21c relative to the condenser optical axis 13.

One of the advantages that accrues to the present invention is that condensers of maximum size can be advantageously used in most systems since the beam path shift means permits the angle $\Omega$ of the exit beam path from the edge of the condenser to be shifted until it includes the objective. In this way, the best glass can be used and the maximum beam path angle achieved with the result of greatly enhanced resolution. Furthermore, in the present invention, unlike prior art systems, most of the optimally angled light beam can enter the objective rather than merely just an edge or small portion of the light cone, thereby creating the brightest possible image for the available light.

While the single beam system described above is capable of greatly enhancing a microscope's resolution, the improved resolution is primarily along the direction of the axis of the illuminating beam (as projected onto the specimen plane), with the resolution along a direction 90 degrees thereto being significantly degraded.

Resolution and sharpness are ultimately dependent upon the number of orders of diffraction wavelets that can be collected and recombined by the objective lens. FIGS. 1D, 1E and 1F illustrate the relative number of orders of wavelets that can be seen by the objective lens under the illuminating conditions shown in FIGS. 1A, 1B and 1C, respectively. In FIG. 1E, which corresponds to the oblique illuminating conditions of FIG.

1B, the objective lens collects and recombines more orders of diffraction wavelets 25 than shown in FIG. 1D which corresponds to the axial illuminating system of FIG. 1A. However, the increase in the order of wavelets collected in the X dimension is linked to a decrease in the order of wavelets collected in the Y dimension. This increase (or decrease) in resolution relative to the resolution attainable with axial illumination, is proportional to 2 times the cosine of angle $\phi$, where angle $\phi$ is the angle of orientation of the specimen (not shown) relative to the axis of the oblique illumination. Angle $\phi$ ranges from 0 to 90 degrees, where 0 degrees is the X dimension (or the axis of oblique illumination) and 90 degrees is the Y dimension.

In FIG. 1F, which corresponds to the maximum oblique illuminating conditions, as shown in FIG. 1C, the number of diffraction wavelets 25 collected and recombined by the objective is even greater than the number attainable with the oblique illuminating conditions shown by FIG. 1B and 1E. This results from the fact that the objective lens is viewing the wave front at such a highly oblique angle that the spacing of the wavelets appears foreshortened and so more wavelets can be seen by the objective. This additional increase in resolution is proportional to the sine of the angle between the axis of the oblique illuminating beam and the optical axis 16 of the objective lens means.

Thus, there is an increase in resolution that is related to the amount of lateral displacement of the illuminating beam and there is also an increase in resolution that is related to the angle of the illuminating beam relative to the optical axis. The total increase in resolution is the combined effect of both of these elements.

One of the outstanding features of the present invention is that the illumination beam shift means (i.e. mirror 11) is located off the condenser axis thereby permitting a plurality of such beam shift means to operate within the system simultaneously. Thus, improved resolution over the entire specimen plane can be achieved by utilizing a plurality of illuminating beams positioned to have their respective axes at selected angles to one another.

Referring to FIG. 2, a pair of beam path shift means in the form of mirrors 23 and 24 disposed off the optical axis 13 of condenser 12 permit the system to operate with two independent illuminating beams to the condenser lens means 12. A light beam source means (lamp) 26 directs a light beam 27 along a source beam path 28 that includes the beam path shift means 23. Similarly, a light beam source means (lamp) 29 directs a light beam 31 along a source beam path 32 which includes beam path shift means 24. Mirror 23 shifts the direction of beam path 28 to path 28a which passes through condenser 12. Mirror 23 is disposed a distance radially away from the condenser axis 13 and at an angle $\pi$ relative to its incident light beam 27 which produces the exit beam path 33 from condenser 12 to emerge from the edge of the lens at the maximum angle which includes the objective 14. Similarly, mirror 24 shifts the direction of beam path 32 to path 32a which includes condenser 12. Mirror 24 operates in precisely the same way as mirror 23 to produce the desired exit beam path 34 from condenser 12.

The relationship of the locations of mirrors 23 and 24 relative to axis 13 is shown in FIG. 2A, but can be different depending on the results desired. For example, the shift means can be disposed in essentially opposing relationship (180 degrees apart) for 3-D viewing purposes as shown in FIG. 2A, or at essentially right angles (90 degrees apart) as shown in FIG. 2B, to achieve the best overall resolution for a two beam system. Resolution over the entire specimen plane is improved by increasing the number of beams. A three beam system as shown in FIG. 2C, where the beam shift means 30 are evenly angularly spaced (120 degrees apart) about axis 13, provides improved resolution over the entire specimen plane. Increasing the number of beams even further to as many as six (not shown) will produce even better results. Because of the off axis placement of the beam shift means, numerous other arrangements of mirrors and spacing are possible to meet specific needs.

For example, it has been found that the best 3-D results are achieved with a two beam system by locating the beams off of a 180 degree line by up to 45 degrees, with approximately 30 degrees being optimum. By positioning the beams in this way, resolution is improved, shading is improved, and the 3-D effect is not degradable.

For purposes of the present invention, the source of light beams 27 and 28 (FIG. 2) can be from separate independent light beam sources as shown, or from a light beam source means providing a single light beam which is split by beam splitting means (not shown) which are well known in the art. More important than the source of the light, are the multiple beams 27 and 31 directed along separate, independent paths to the condenser, and the resultant exit beam paths 33 and 34 which do not fall along the optical axis 16 of the objective lens means 14.

Likewise, while mirrors provide one means of beam shifting, other means exist, such as prisms, and the fact that all such means are not shown does not mean that any of them are excluded from the invention. The present invention, in fact, encompasses an arrangement of separate micro light sources, as could be provided using fiber optics, with the beam shift means comprising mechanical or electro-mechanical means for positioning and directing these light sources. In all cases, the invention is manifest by separate, independent, light beams directed to the condenser means.

Additionally, for the purposes of the present invention, the beam shift means is shown to be adjustable in order to accommodate a large variety of different objective lenses. However, with a given objective lens/condenser lens combination, there is no necessity for an adjustable beam shift means, and a fixed or pre-adjusted beam shift system would suffice. Thus, the present invention includes such fixed systems known in the art that will direct light beams into a condenser lens at the appropriate location and angle of orientation.

One of the outstanding features of the multiple beam embodiment of the present invention is the intensity of light available to illuminate the speciment at the specimen plane 20. Unlike prior art devices that create angled light beams, the present invention does not require the use of masks or other light occluding devices. Thus, the present invention makes it possible to increase the light from the light beam source means for illumination of the specimen.

While the light beam source means has been shown schematically as a light bulb, it will be understood by those skilled in the art that the light beam source means may include any suitable source of light as well as lens means and other optical devices well known for the purpose of furnishing object illuminating radiation.

Another important feature of the multiple beam embodiment is that it is able to overcome the anisotropy that is inherent in all oplique illuminating systems known in the prior art. The anisotropy of resolution and sharpness has been discussed above. Another effect of the anisotropy associated with prior art systems is the obvious uneven illumination of the image field. That is, one side of the field of view appears bright while the opposite side appears dark. The introduction, in the present invention of multiple beams makes it possible to produce an evenly illuminated field of view.

The utilization in the present invention of a plurality of light beams following different paths to the condenser makes it possible to individually manipulate those beams for a variety of possible results in addition to enhanced resolution. For example, referring to FIG. 2, real time 3-D is achieved by interposing complimentary polarizing filters 36 and 37 in beam paths 28 and 32, respectively together with providing similar eye piece polarizing filters 38 and 39 in binocular eye piece 41 having a pair of viewing lenses 42 and 43. The filters 36 and 37 are denoted by positive and negative symbols to indicate that they could be complementary in a variety of different ways known in the art. They may be plane polarizers oriented with their polarizing axes mutually at right angles. Alternatively, they may be circular polarizers, one of the pair producing left-hand polarization, the other producing right-hand polarization. Yet in another alternative, the filters may be complementary color filters (such as red and green) of either the absorption or dichroic type. The eye piece filters 38 and 39 interact with filters 36 and 37 to selectively limit the light from only one of the light sources 26 and 29 so that the image produced by the light along beam path 33 does not exit the viewing lens 43, and the image produced by the light along beam path 34 does not exit the viewing lens 42.

The overlap of the filtered beams which is possible by adjustment of beam path shift means 23 and 24 creates real 3-D images and by being able to independently control the direction of the light paths of the beams, it becomes possible to control the parallax angles for left and right images, and thereby control the degree of depth perception in the final image.

The present invention goes far beyond what can be achieved with a single beam, real time, 3-D system in which the degree of parallax is fixed, and there is very little disparity in parallax between the left and right images, especially at the center of the image field. In contrast, with the present invention the left and right images are independently controlled and the degree of parallax between them can be easily adjusted to match the type of objective being employed and the type of specimen being viewed. In addition, there is another and possibly even more important advantage with the present invention, which is the ability to increase depth of field without attendant loss of resolution. This is a critical prerequisite for producing a sharp 3-D image.

In order to create a 3-D photographic record (stereo pair) of a specimen illuminated by a two beam system of the present invention, all that is required is that one photograph be taken with one beam operative in the system (on) and the other inoperative (off) and then a second photograph taken with the operative and inoperative beams reversed. No filters are required.

For real time 3-D viewing, however, it is necessary to separate the beams so that the illumination of each beam enters a different one of the eye pieces. This can be done as suggested above by using filters. Filters, however, invariably have a degrading effect on the ultimate image viewed. Color filters reduce the available light and can distort the specimen color, especially for stained specimens. Polarizing filters require the use of special lenses and do not produce total exstinguisment (separation).

Because the present invention makes two beams available at their sources, total separation can be achieved without the use of filters, by using a shutter system instead. By the use of a shutter system (mechanical or electronic) the source beams can be divided into alternating pulses and gated into the eye pieces so that only the pulses from one source beam enter a particular eye piece and the pulses from the other source beam enter only the other eyepiece. By creating approximately twenty four or more pulses a second, the eye is unaware that the illumination is not continuous.

Referring to FIG. 2D, a mechanical source beam shutter 100 having a rotatable shutter plate 101 is interposed into beam path 28 so as to alternately pass and block the transmission of beam 27 depending whether one of its transparent quadrants 102 or opaque quadrants 103 is in the path. While a four section shutter plate is shown for illustrative purposes, a different number of sections can be used without departing from the invention.

A second four section source beam shutter 104 having a rotatable shutter plate 105 is disposed in the beam path 32 to alternately pass and block the transmission of beam 31 depending whether one of its transparent quadrants 106 or its opaque quadrant 107 is in the path. The source beam shutters 100 and 104 are synchronized so that when one is passing a beam the other is blocking a beam and visa versa. Thus, at any instant of time only one beam illuminates the specimen plane 20 and objective 14. The frequency at which the beams alternate illuminating the objective is determined by the number of shutter sections multiplied by the frequency of rotation of the shutter. To prevent the viewer from experiencing a "flicker effect" the frequency at which the beams switch should be above twenty four times per second.

The 3-D effect is achieved by having the light from source 26 enter only one of eye pieces 42, 43, and the light from source 29 enter only the other eye piece. This is achieved by an eyepiece shutter 110 having a rotatable shutter plate 111 and an eyepiece shutter 115 having a rotatable shutter plate 116 which are substantially identical to source beam shutters 101 and 104 and synchronized therewith. Eyepiece shutter plate 111 has a pair of transparent quadrants 112 and a pair of opaque quadrants 113 which alternate, as the shutter rotates, in passing and blocking light from the objective 14 to the eyepiece 42. Similarly, eyepiece shutter plate 116 has a pair of transparent quandrants 117 and a pair of opaque quandrants 118 which alternate, as the shutter rotates, in passing, and blocking light from the objective 14 to the eyepiece 43.

The shutters are synchronized such that whenever a transparent section 102 of source beam shutter plate 101 is in beam path 28, a transparent section 112 of eyepiece shutter plate 111 passes light from objective 14 to eyepiece 42, while source beam shutter plate 105 and eye piece shutter plate 116 present opaque sections which block the transmission of light from source 29 and objective 14, respectively. The situation is simply reversed when an opaque section 103 of shutter plate 101 is in path 28: an opaque section 113 blocks light from objective 14 from entering eye piece 42 while light passing through the transparent section 106 of source beam shutter plate 105 passes from the objective 14 through the transparent section 117 of eye piece shutter 116 to eye piece 43. High resolution, high definition, color correct, bright images in 3-D are thereby achieved.

Without departing from the scope of the invention, the mechanical shutters 100, 104, 110 and 115 can be replaced with any other means of alternatively blocking and passing light, such as electronic LCD shutters or other such devices known in the art.

A microscope utilizing the illumination system of the present invention can use any of the many light beam manipulation devices known in microscopy, such as di-polarizing filters, aperture stops, collimator, etc. In multiple beam systems of the present invention these devices can be used to provide beams having different characteristics or those having the same characteristics.

Since resolution is enhanced by oblique illumination primarily along the axis (in both directions) of the illuminating light beam, while being diminished along the axis 90 degrees thereto, a first order approximation of high resolution over the entire specimen plane is achieved using two beams. Adding more beams will further enhance the distribution of high resolution over the specimen plane. However, little is gained by using more than 5 or six oblique light beams, radially spaced about the optical axis. As can be seen from the previous discussion about the anistropy of resolution associated with a single oblique beam (FIGS. 1E and 1F), the fall-off in resolution is negligible within 15 degrees or so either side of the axis of each illuminating beam (it is proportional to the cosine of that angle).

By way of example for a 3 beam system, referring to FIGS. 3, 3A and 3B, mirror surfaces 45, 46 and 47 are supported on beam shift means 48, 49 and 50, respectively. Each mirror surface is disposed in one of the source beam paths 51, 52 and 53, of light beams 54, 56, and 57, respectively, emanating from light beam sources means 58, 59 and 61. The shift means 48, 49 and 50 as best seen with reference to FIGS. 3A and 3B, are movable along paths 55 that are radial relative to the optical axis 13 of the condenser means 12 (see FIGS. 2 and 3). For purposes of the present invention, the beam shift means are positioned at locations on their paths 55 that place the beam reflecting mirror surfaces 45, 46 and 47 radially outward from the axis 13. As fully described above, varying the location of a mirror (45 for example) along its radial path 55 varies the angle of the beam exit path 66 (see FIG. 3) from condenser lens means 12.

Referring to FIG. 3C, "bright field" illumination is available in the present system by locating one of the mirror surfaces (47 for example) over the optical axis 13 and in a position in which it creates a beam path that travels along the condenser lens means axis 13. The other mirror surfaces can be deployed to provide oblique lighting at the same time or disabled (mirrors moved out of range of the condenser means or associated light beam source means turned off) for standard "bright field" illumination.

Positioning of the shift means 48, 49 and 50 can also result in "dark field" illumination. When the radial location of the mirror surfaces create beam exit paths from the condenser means that are angled to fall outside of the objective aperture, "dark field" illumination is made possible.

Referring to FIG. 3, each mirror surface 45, 46 and 47 is also angularly tiltable relative to its associated source means beam so as to vary the angle of reflectance of its mirror surface. Thus, by tilting a mirror surface the angle of the beam path from the shift means to the condenser means 12 is varied and in turn the location of the exit beam path from the condenser means is varied.

The source means beams 54, 56 and 57 follow source beam paths 51, 52 and 53 to the light path shift means 48, 49 and 50 that are generally normal to the axis 13 of condenser means 12 and evenly angularly spaced about the axis 13 of the condenser 12 and the axis 16 of the objective lens means 14 which axes are shown as being coincident (see FIG. 2). The mirrors 45, 46 and 47 are positionable radially and angularly to establish the direction of the beam paths 62, 63 and 64 to the condenser lens means 12, and thereby control the location and direction of the exit paths 66, 67 and 68 from the condenser means to the objective means.

The practicalities of size and space between the shift means and the condenser lens means 12 makes it very difficult to gather all of the light from the individual beams 54, 56 and 57 and direct it onto condenser lens 12 at precisely the location and angle necessary to achieve the desired exit paths from condenser lens 12. A large field lens 71 (such as a 50 mm f/1.2 camera lens) acts as a pre-condenser lens means permitting the gathering of all of the light from the incident beams and the accurate direction of those light beams onto the condenser lens 12. The raising or lowering of the field lens 71 relative to the condenser lens 12 has the effect of sizing the beam on the specimen plane 20 to accommodate low power as well as high power systems.

Furthermore, a field lens aperture (iris stop) 72 can be used to control depth of field and contrast, provided the condenser means 12 is slightly under focused. Prior art systems reduce the condenser lens aperture to increase depth of field but in doing so reduce resolution due to a concomitant reduction in the numerical aperture of the light beam exiting the condenser. However, in the multiple beam embodiment of the present invention, the condenser aperture 69 remains fully open while the field lens aperture 72 can be reduced to increase depth of field without a concomitant loss in resolution. This is because the aperture of each illuminating beam is reduced while the overall aperture of illumination that exits the condenser lens is not significantly reduced. The multiple beams illuminate the full condenser aperture and no loss of resolution is experienced.

The interposition of the field lens 71 and iris stop 72 does not interfere with the operation of the present invention since adjustment of the mirror surfaces 45, 46, and 47 continues to control the direction and location of the exit paths of the beams from the condenser lens 12.

Likewise, the interposition in the source beam paths 54, 56 and 57 of such devices as lamp condensers 73, zoom lens 74 (to adjust beam size), and polarizing filters 76 does not interfere with the operation of the present invention and in fact highlights one of its major advantages. The use of such light manipulating devices on the light beams either separately (between the light source and the shift means) or together, such as by the field lens 71, the field lens aperture (iris) 72 or a polarizing filter 77 (between the shift means and an eye piece 78), does not reduce the system's resolution.

Where light sources 58, 59 and 61 are independent (as opposed to a single source split by optical means) they can be varied in intensity to add yet a further investigatory variation.

From the forgoing it is apparent that in order to achieve enhanced resolution the present invention does not limit the use of well known optical devices for light manipulation nor does it result in operation at low light levels relative to the light provided by the light source means. Thus, the illumination system of the present invention enhances resolution and at the same time makes it possible to create illumination conditions that can satisfy a wide variety of investigation needs.

A multi-beam system of the present invention enjoys enhanced resolution both from an increase in the oblique orientation of the illuminating beams relative to the objective lens means optical axis (increase in orders of wavelets recombined) as well as from an increase in the overall aperture of illumination of the condenser lens due to the additive effect of the multiple light beams that exit the condenser from around its periphery.

When polarizing filters 76 in the source beam paths 54, 56 and 57 from the light source means to the beam shift means are complementary, rotation of polarizing filter 77 in the combined beam between the objective lens means 14 and the eyepiece lens 78 permits rotation of the shadow effect of the oblique lighting on the specimen by effectively attenuating the illumination from one two of the beams while looking at the effects of the other.

When a specimen is very thin and transparent (e.g. living cell cultures or unstained cells) it is well know in the art to use phase-contrast lenses to achieve a visible image. All known systems using a phase-contrast technique do so using light that is axial with the condenser lens. In the present invention the use of phase-contrast condenser lenses and phase-contrast objective lenses in place of the condenser and objective lenses described above, together with multiple oblique light beams as described above, produces the unexpected results of an illumination system capable of producing phase-contrast images equal in all respects to such images achieved in known systems, but which have greater resolution and greater depth of field. Moreover, it is possible with the present invention to produce real time 3-D images of such illusive specimens with all of the enhancements that flow from the present invention as described fully herein.

The present invention is independent of any particular mechanical or electrical system for positioning and directing the illuminating beams. This includes systems that may be adjustable or pre-adjusted and fixed, and may utilize mirrors, prisms, fiber optics or other known or unknown devices. Such mechanical systems can take any number of forms known to those skilled in the art. By way of example, such a mechanical arrangement for positioning the mirrors of the shift means is described with reference to FIG. 4.

A shift means 80 includes a mirror 81 affixed to a tilt arm 82 which is rotatably connected by hinge 83 to an "L" shaped mount member 84 which is secured to a car 86 that runs in tracks 87. A cable 88 attached to a tab 89 formed on the end of mount member 84 provides the means for positioning the car 86 on the track 87 and thus the radial position of the mirror 81 relative to an optical axis. A pivot arm 91 is pivotally attached at one of its ends to the tilt arm 82 and at its other end to a slide 92 that runs in a groove 93 in the mount member. A cable 94 affixed to a tab 96 formed in the end of slide 92 positions the slide in its groove and in doing so adjusts the tilt of the tilt arm 82 and the angle of the mirror 81. The use of micrometers (not shown) attached to the ends of the cables 94 and 98 to operate the cables makes it possible to achieve the degree of precision necessary for the invention.

A number of shift means 80 in the same system can be mechanically inter-connected (by means well within the skill of the art) so that their positions will be interdependent. That is, the movement of one shift means to a new radial location or the tilting of a mirror to a different angular position will cause corresponding movement in the other shift means. This arrangement sets a fixed relationship between the mirrors and makes it possible to easily assure that all of the beams are substantially identical in their paths through the system other than their circumferential position relative to the objective axis 16.

Where it is desired to be able to vary one beam path without disturbing the others, then the positioning of the shift means is most advantageously mechanically independent. In the preferred embodiment of the invention the mirror members are selectively mechanically inter-connected for unified movement and mechanically unconnected for independent movement. Such a system is capable of satisfying the needs of a wide variety of microscope uses.

Once again, the present invention is independent of any particular mechanical system for interconnecting the beam shift means which mechanical systems can take any number of forms known to those skilled in the art.

The method of the present invention for increasing resolution, sharpness and depth of field in a transmitted light microscope having a condenser lens means with an optical axis, and an objective lens means with an optical axis, which is apparent from the forgoing, constitutes the steps of directing a plurality of independent light beams onto the condenser lens means along paths that are not coincident with the condenser lens means optical axis; and fixing the location and direction of the paths of the light beams to the condenser lens means so that the light beams that exit the condenser lens means are directed along paths that include the objective lens means and are oblique relative the optical axis of the objective lens means. Further, the directions of the paths of the light beams onto the condenser lens means are selected to produce exit paths from the condenser lens that are at the optimal angle relative to the optical axis of the objective lens means that includes the objective lens means.

When the number of beams is two and they are directed along paths that are between 90 and 180 degrees apart relative to the condenser axis, they provide the best illumination for real-time 3-D viewing. When they are at right angles (90 degrees to one an other) they provide the best overall resolution using just two beams. When the number of beams is three or more they are preferably radially positioned and spaced about the optical axis of the condenser lens means for the best overall resolution at the specimen plane.

The invention having been fully described, it is not to be limited to the details herein set forth, but is of the full scope of the appended claims.

What is claimed is:

1. An illumination system for a transmitted light microscope including a condenser lens means having an optical axis, and an objective lens means having an optical axis, comprising in combination:
- light beam source means for providing two independent light beams along different source beam paths which are non-coincident with the optical axis of the condenser lens means;
- light beam shift means operable to shift the path of a source means light beam and redirect it along an incident path that passes through the condenser lens means, and an exit path from the condenser lens means that passes through the objective lens means, wherein the exit path is oblique to the optical axis of the objective lens means;
- means for supporting a specimen at a specimen plane between the condenser means and the objective means; and
- said shift means disposed relative to one another so as to establish light beam paths which at the specimen plane are between 90 and 180 degrees apart.

2. The invention of claim 1 wherein the condenser lens means and the objective lens means include phase-contrast lenses.

3. The invention of claim 1 wherein said shift means are disposed relative to one another so as to establish light beam paths which at the specimen plane are between 100 and 140 degrees apart.

4. The invention of claim 1 wherein said shift means are disposed relative to one another so as to establish light beam paths which at the specimen plane are approximately 120 degrees apart.

5. An illumination system for a transmitted light microscope including a condenser lens means having an optical axis, and an objective lens means having an optical axis, comprising in combination:
- light beam source means for providing a plurality of independent light beams along different source beam paths which are non-coincident with the optical axis of the condenser lens means; and
- a plurality of light beam shift means operable to shift the path of a source means light beam and redirect it along an incident path that passes through the condenser lens means, and an exit path from the condenser lens means that passes through the objective lens means, wherein the exit path is oblique to the optical axis of the objective lens means; and
- wherein the condenser lens means and the objective lens means include phase-contrast lenses.

6. The invention of claim 5 wherein said light beam shift means are operable to variably alter the direction of the path of their associated light beam to the condenser lens means over a range that includes exit paths from the condenser means that passes through the objective lens means.

7. The invention of claim 5 wherein said light beam shift means are operable to variably alter both the location and angle of the exit beam paths from the condenser lens means.

8. The invention of claim 5 wherein the number of source light beams and the number of said light beam shift means is three.

* * * * *